June 11, 1935.  R. F. PEO ET AL  2,004,902
HYDRAULIC SHOCK ABSORBER
Filed Feb. 28, 1934  2 Sheets-Sheet 2
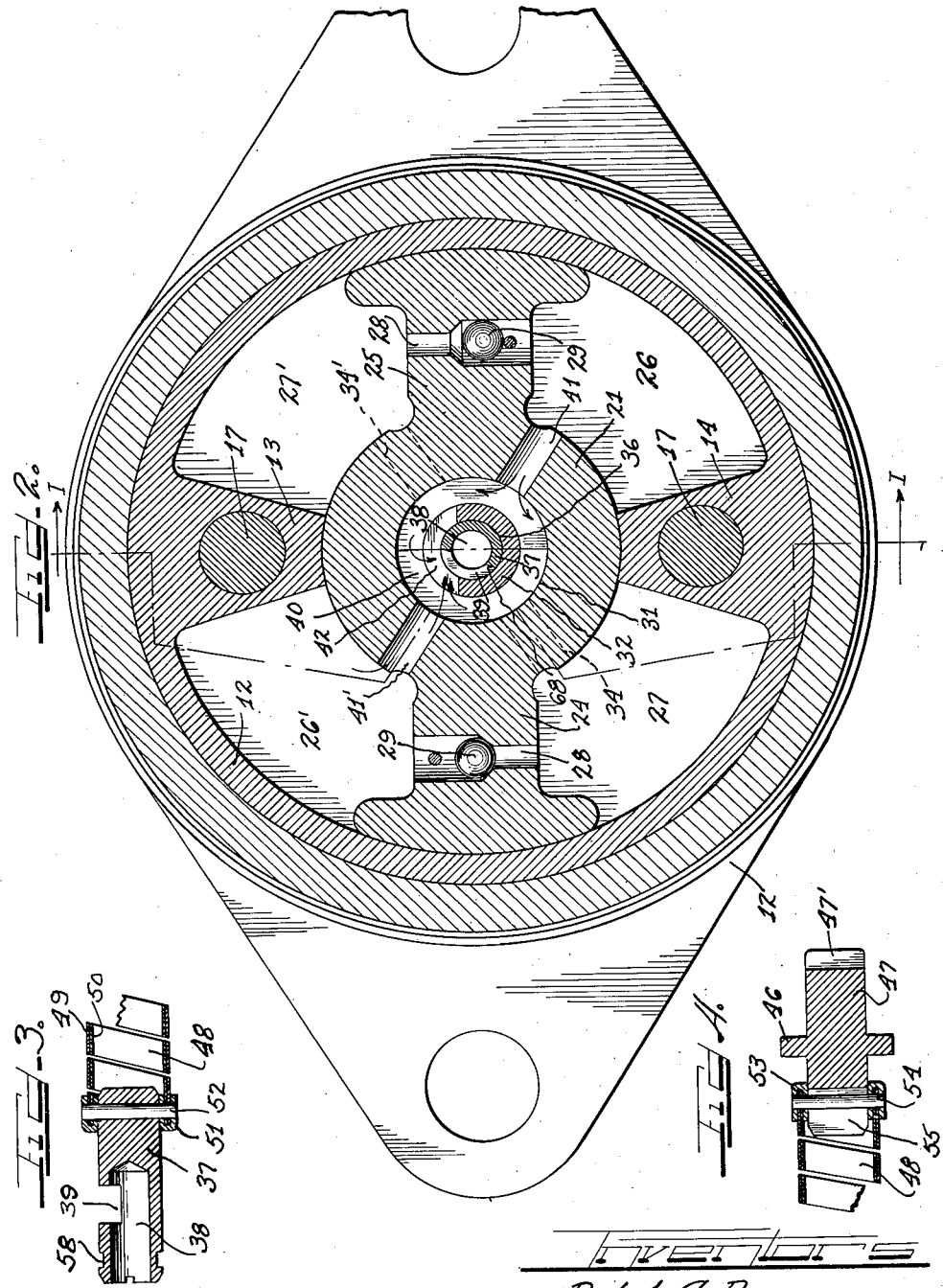
Inventors
Ralph F. Peo.
Carl F. Lautz.
by Charles W. Hills Attys.

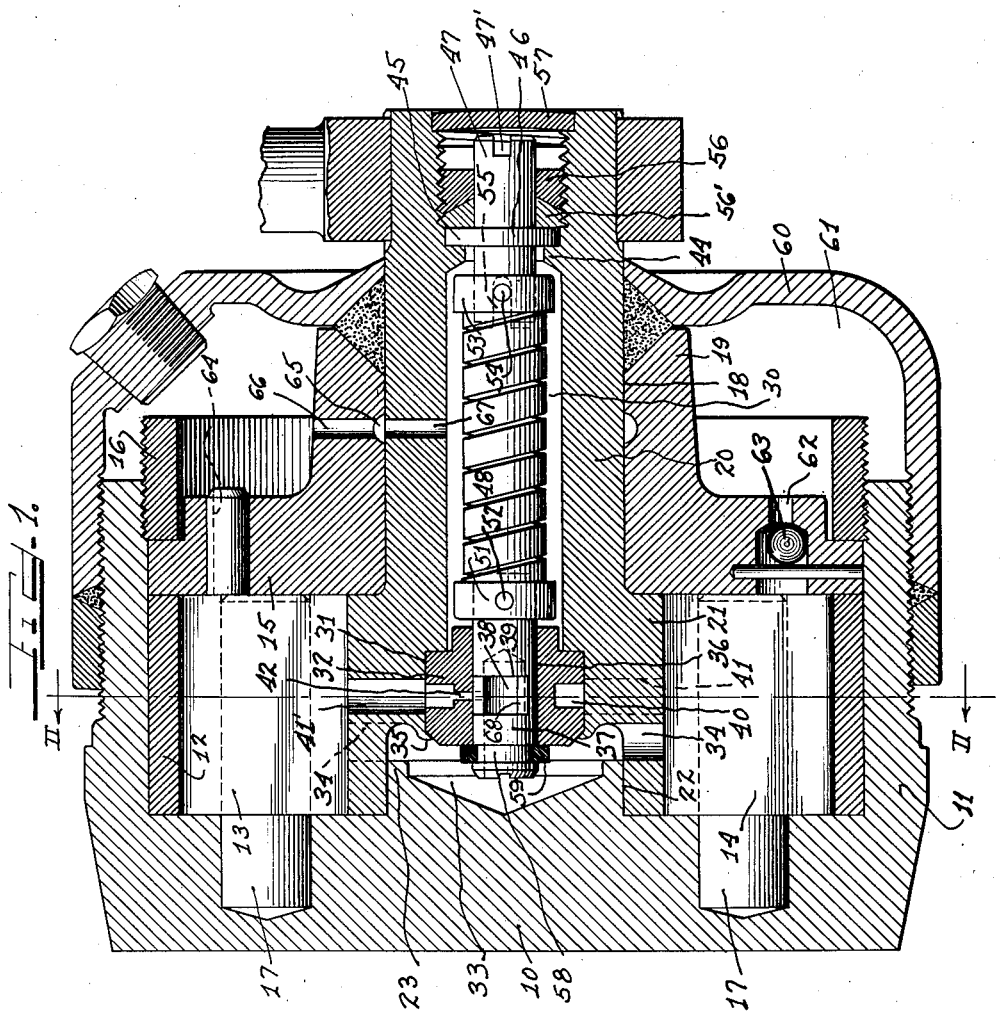

Patented June 11, 1935

2,004,902

UNITED STATES PATENT OFFICE 2,004,902

HYDRAULIC SHOCK ABSORBER

Ralph F. Peo and Carl F. Lautz, Buffalo, N. Y., assignors to Houde Engineering Corporation, Buffalo, N. Y., a corporation of New York Application February 28, 1934, Serial No. 713,247

12 Claims. (Cl. 188—89)

This invention relates to hydraulic shock absorbers and particularly to improved and simplified thermostatic valve structure for controlling the flow of the resistance fluid.

The invention relates particularly to valving arrangement in which a rotary valve is thermostatically adjusted by a thermostat element in the form of a helix, an important object being to reduce the number of parts and to provide structure and arrangement which will facilitate assembling.

Another important object is to provide improved arrangement which will hold the valve accurately to its seat and which will permit the thermostat element to function freely and without strain to accurately adjust the valve in response to temperature variations.

The various features of the invention are incorporated in the structure disclosed on the drawings, in which drawings:

Figure 1 is a longitudinal section of a hydraulic shock absorber on plane I—I of Figure 2;

Figure 2 is a section on plane II—II of Figure 1;

Figure 3 is a section through the valve and thermostat connected therewith; and

Figure 4 is a section of the valve adjusting head and thermostat connection therewith.

The shock absorber shown is of the rotary type. Briefly describing the structure, it comprises a base 10 having the cylindrical wall 11 extending therefrom, the base having wings 12 for mounting on a support, usually the chassis of the vehicle. Fitting within the wall 11 is the ring 12 having the upper and lower partition lugs 13 and 14 extending radially inwardly therefrom. An outer wall 15 fits into the outer end of the wall 11 and abuts the ring 12 and the partition lug and is secured in place by a ring nut 16 threading along the interior of the wall 11. Pins 17 extend through the partition lug and secure them rigidly to the base 10.

The outer wall 15 has the bearing bore 18 which is continued through the lug or flange 19 extending outwardly from the wall and this bore journals the shaft 20 having at its inner end the cylindrical hub 21 which extends axially between the wall 15 and the base 10 and has the cylindrical bearing pocket 22 for receiving the centering end bearing lug 23 extending from the base 10. Extending radially from opposite sides of the shaft hub are the piston members 24 and 25 whose outer ends fit against the ring 12 between the partition walls 13 and 14, the piston members extending axially between the wall 15 and the base 10. The piston members or vanes and the partition lugs and the ring 12 divide the interior of the shock absorber into the high pressure working chambers 26, 26' and the low pressure chambers 27, 27'. Each of the piston vanes has a passage 28 therethrough controlled by a check valve 29 which permits flow of fluid from the low pressure chambers into the high pressure chambers but prevents flow in the opposite direction.

The shaft 20 has the axial bore 30 extending therethrough which bore is of enlarged diameter at its inner end to form a cylindrical pocket 31 for receiving the cylindrical valve seat block 32. The space 33 between the seating member 32 and the bearing lug 23 is connected by ports 34 and 34' with the low pressure chambers 27 and 27' respectively.

The valve seat member 32 is frictionally held against rotation in the pocket 31 and may be held against axial displacement by deflecting against the outer end thereof the rim 35 of the pocket after the seat member has been inserted. The seat member has the axial cylindrical bore 36 therethrough in which is journalled the cylindrical valve plug 37. The valve plug has the longitudinal bore 38 extending part way therethrough from the outer end thereof and this bore communicates with the space 33 which is connected by the ports 34, 34' with the low pressure chamber. The valve plug is cut transversely at one side to leave a port 39 which communicates with the bore 38, the ends 68 of the port forming vane surfaces whose function will be referred to hereinafter.

The valve seat member 32 has the circumferentially extending outer channel 40 communicating with the ports 41 and 41' through the piston hub 21 and in communication with the high pressure chambers 26 and 26' respectively. The seating member 32 is slitted transversely to form a narrow radial port 42 extending a distance circumferentially and connecting the channel 40 with the valve port 39. Upon rotation of the valve plug its port 39 will span more or less of the port or orifice 42 thereby determining the resistance to the flow of the hydraulic fluid, particularly from the high pressure chambers to the low pressure chambers of the shock absorber as the piston shaft is rotated by the lever 43 during rebound of the vehicle spring, the lever 43 being connected usually with the vehicle axle. During such rebound movement of the shock absorber piston all the fluid must flow through the passage provided by the open part of the orifice 42 as the check valves 29 through the piston vanes are then closed. During the bump stroke of the piston these check valves open and only part of the fluid will flow through the orifice 42.

Near its outer end the shaft 20 has the internal flange 44 extending into the bore 30 and providing the outer square shoulder 45 against which abuts the cylindrical flange 46 on the cylindrical adjusting head 47. Within the bore 30, between the inner flange 44 and the valve seat member 32, is located the thermostat element 48 which is shown in the form of a helical coil of two layers 49 and 50 of metal having different coefficients of expansion. At its inner end the coil is secured to a suitable ferrule 51 which receives the inner end of the valve plug 37 and is secured thereto as by means of a rivet or pin 52. At its outer end the coil is secured to a ferrule 53 which receives the inner end of the adjusting head 47, a pin 54 extending diametrally through the ferrule and secured thereto and being received in the diametrally extending slot 55 cut in the end of the adjusting head. The coil must thus turn with the adjusting head but is free for longitudinal movement thereon. The adjusting head may have a cross slot 47' in its outer end so that it may be readily turned as by means of a screw driver for manual setting of the valve plug in its seat member 32. An annular nut 56 has threaded engagement in the outer end of the shaft bore and surrounds the outer end of the adjusting head and compresses packing material 56' against the sides of the bore and the flange 46 on the adjusting head so as to frictionally hold the head in adjusted position and also to seal the bore against escape of any hydraulic fluid which may have entered the bore. The adjusting head may be protected by a disc or plug 57 secured in the outer end of the shaft bore.

After setting of the adjusting head 47 the thermostat coil will be anchored at its outer end and its winding or unwinding movement in response to temperature changes will cause the valve plug to be rotated in the seat member 32 for adjustment of the valve port 39 relative to the orifice port 42. The ferrule 51 is close to the outer end of the seat member 32 and limits the inward axial displacement of the valve plug. To limit the outer axial displacement of the valve plug I have shown its inner end provided with an annular channel 58 for receiving a split steel ring 59 which can be readily sprung over the end of the valve plug and into position in the channel to form an abutment for engaging with the inner side of the seat member 32 to limit the axial outward displacement of the valve plug. The axial displacement of the valve plug is very limited and just sufficient to prevent any binding of the valve plug so that it may be freely and readily rotated by the thermostat element. Any axial lengthening or shortening of the thermostat coil will not be interfered with on account of the freedom of movement of the pin 54 in the slot 55 in the adjusting head 47. No strains will therefore be imposed on the thermostat coil so that it may freely function in response to temperature changes to properly set the valve plug for compensation for change of viscosity of the hydraulic fluid as the temperature thereof changes. With this improved arrangement we eliminate the need of stem structures or other structures on the valve or adjusting head which have heretofore been necessary to prevent buckling or straining of the thermostat coil.

Our improved arrangement also simplifies and facilitates assembly of the shock absorber and valve structure. Before insertion of the seat member 32 in the shaft the valve plug, with the thermostat coil secured to the inner end thereof, is first seated in the member 32 and the abutment collar 59 then applied to the outer end of the valve plug. This assembly is then inserted into the shaft and the edge 35 then deflected against the outer side of the seating member 32. The piston structure will then be assembled in the shock absorber housing structure and the adjusting head 47 will then be inserted to engage its inner end in the outer ferrule 53 of the coil and with the slot 55 receiving the pin or key 54. The packing 56 and the nut 55 will then be applied and then after the manual setting of the valve is accomplished by turning of the head 47 the closure plug or disc 57 is applied. The friction and pressure of the packing 56 against the adjusting head and its flange 46 will securely hold the flange against the shoulder 45 and secure the head against axial or rotational displacement so that the manual setting of the valve plug will be maintained. The thermostat coil will then function automatically to adjust the valve plug to determine the resistance to fluid flow through the passages connecting the high and low pressure working chambers.

The cup shaped shell 60 secured to the wall 11 provides a fluid reservoir 61 from which replenishing fluid may flow through passages 62 into the working chambers but through which passages reverse flow is prevented by the check valve 63. At their upper ends the working chambers are connected with the reservoir by restricted channels 64 so that any collected air or gas may escape into the reservoir.

In the bearing flange 19 is the annular groove 65 surrounding the shaft 20 which collects any leakage along the shaft and returns it to the reservoir through a passage 66. A passage 67 through the shaft connects the groove 65 with the shaft bore 30 so that any fluid leaking into this bore may return to the reservoir, escape of fluid from the bore to the exterior of the shock absorber being prevented by the packing 56.

Our improved valve structure and arrangement lends itself particularly to response of the valve plug to fluid impact for movement of the valve plug toward orifice closing position to a degree proportionate to the velocity of the fluid flow according to the principles of operation as disclosed in the application of Ralph F. Peo, Serial No. 645,725 filed October 5, 1932. During the high pressure or rebound movement of the piston the fluid will flow as indicated by arrows in Figure 2, the fluid after leaving the orifice 42 encountering the flat or vane surface 68 at the advance end of the valve port 39 such impact tending to rotate the valve for further closure of the orifice 42 and consequent increase in the resistance to the fluid flow in proportion to the velocity of the flow. The thermostat coil, besides functioning to set the valve in accordance with temperature changes, will serve to function as a spring for resisting such turning of the valve by impact and will restore the valve as the impact force abates. The rotary movement of the valve under such impact is quite rapid and the thermostat coil will be subjected to a rapid torsional movement which would tend to lengthen it axially if it were not free. By virtue of the key and slot connection of the outer end of the coil with the stationary adjusting head 47, the coil may freely and without interference lengthen or shorten without shifting the valve plug axially to cause any friction engagement of the ferrule 51 or collar 59 against the bearing member 32 and the valve plug will therefore always be free to accurately respond to the pressure impact.

We have shown a practical and efficient embodiment of the various features of our invention but we do not desire to be limited to the exact construction, arrangement and operation shown and described as changes and modifications may be made without departing from the scope and spirit of the invention.

We claim as follows:

1. In combination, a hydraulic shock absorber having formed therein a passage through which hydraulic fluid is adapted to be forced, a longitudinally wound thermostat coil adapted to wind and unwind due to temperature changes, a valve seat, a rotary valve in said seat, one end of said thermostat coil being secured to said valve, and a support for the other end of said thermostat coil arranged to hold said end against rotational movement but allowing axial movement thereof whereby said coil may expand or contract axially without axially moving said valve while turning said valve by its winding or unwinding action.

2. In combination, a hydraulic shock absorber having formed therein a passage through which hydraulic fluid is adapted to be forced, a valve seat, a rotary valve engaging said seat, means preventing axial movement of said valve, a longitudinally wound thermostat concentric with said valve and secured at one end thereto, an adjusting head for manually setting said valve in said seat, and a connection between said adjusting head and the other end of said thermostat element arranged to hold said end against rotational movement but allowing axial movement thereof relative to said head whereby said thermostat element is free to expand or contract axially without exerting axial pressure on said valve.

3. In combination, a hydraulic shock absorber having formed therein a passage through which hydraulic fluid is adapted to be forced, a valve seat in said passage, a valve rotatable in said seat but held against axial movement therein, a longitudinally wound thermostat element secured at one end to said valve, a support, a connection between the other end of said thermostat element and said support for anchoring said end to said support against rotational movement, said connection having lost motion in a direction axially of said thermostat element whereby said thermostat element may freely expand or contract in axial direction while turning said valve in response to temperature changes.

4. In combination, a hydraulic shock absorber having formed therein a passage through which hydraulic fluid is adapted to be forced, a valve seat in said passage, a valve freely rotatable in said seat but held against axial movement therein, a coiled thermostat adapted to wind and unwind due to temperature changes and secured at one end to said valve for automatic adjustment thereof, an anchorage support for the other end of said coil, and a pin and slot connection between said coil and anchorage support arranged to hold said coil end against rotational movement on said support but allowing movement of said end axially whereby said coil may freely expand or contract axially while rotating said valve in response to temperature change.

5. In combination, a hydraulic shock absorber having formed therein a passage through which hydraulic fluid is adapted to be forced, a valve seat in said passage, a valve rotatable in said seat but held against axial movement, a thermostat adapted to wind and unwind due to temperature changes and secured at its inner end to said valve, a support for the outer end of said coil, means anchoring the outer end of said coil to said support against rotational movement, means adapting said outer end of the coil for free movement in axial direction whereby said coil may freely expand and contract axially.

6. In combination, a hydraulic shock absorber having formed therein a passage through which hydraulic fluid is adapted to be forced, a valve seat in said passage, a valve rotatable in said seat but held against axial movement, a thermostat adapted to wind and unwind due to temperature changes and secured at its inner end to said valve, a support for the outer end of said coil, means anchoring the outer end of said coil to said support against rotational movement, means adapting said outer end of the coil for free movement in axial direction whereby said coil may freely expand and contract axially, said support being manually rotatable for manual setting of said valve in said seat and said coil by the winding and unwinding movement thereof automatically setting said valve to adjust for flow through said passage in accordance with change in temperature of the hydraulic fluid.

7. In a hydraulic shock absorber, means providing a space for hydraulic fluid, a piston structure operable in said space to displace the fluid, a passageway for flow of fluid from one side of the piston to the other, a valve seat interposed in said passageway, a valve in said seat having a port included in said passageway, said valve being rotatable to control the fluid flow resistance through said passageway, abutments on the valve cooperating with said seat to prevent axial displacement of the valve, a coiled thermostat connected at one end with said valve, a support for the other end of said thermostat coil and a connection between said end and said support arranged to prevent relative rotation between said end and support but to permit relative longitudinal movement whereby winding or unwinding of said thermostat coil will rotate said valve for adjustment of said passageway and whereby said coil may expand or contract axially without resistance.

8. In a hydraulic shock absorber, the combination of means providing a space for hydraulic resistance fluid, a piston operable in said space to displace the fluid, a passageway for the flow of fluid from one side of the piston to the other, a valve seat interposed in said passageway, a valve having a port interposed in said passageway, said valve being rotatable whereby to control the resistance to flow through said passageway, means holding said valve against longitudinal movement in said seat, a helical thermostat coil secured at one end to the valve and extending concentric therewith, and means anchoring the other end of said coil against rotational movement but arranged to permit axial movement thereof whereby said coil may wind or unwind to rotate said valve for adjustment of said passageway but will be entirely free to shorten or elongate axially.

9. In a hydraulic shock absorber, means providing space for hydraulic fluid, a piston operable in said space to displace the fluid therein, a passageway for the flow of fluid from one side of the piston to the other, a valve seat interposed in said pasageway, a valve in said seat having a port included in said passageway, said valve being rotatable in said seat whereby to determine the resistance to the fluid flow through said passageway, inner and outer abutments on said valve for preventing longitudinal movement of said valve, a thermostat coil secured at one end to the inner abutment of said valve, and means for anchoring the other end of said coil against rotational movement but arranged to permit axial movement thereof whereby unwinding or winding of said coil in response to temperature changes will rotate said valve for adjustment of said passageway and said coil will be entirely free to lengthen or shorten axially.

10. In combination, a hydraulic shock absorber having formed therein a passage through which hydraulic fluid is adapted to be forced, a valve seat in said passage, a rotatable valve member in said seat, a stationary supporting member, a thermostat coil between said members, means securing one end of said coil to one of said members against both rotary or axial movement relative to said member, and means securing the other end of said coil to said other member against relative rotary movement but arranged to permit axial movement thereon whereby said coil may lengthen or shorten axially without moving said valve axially.

11. In a hydraulic shock absorber having formed therein a passage through which hydraulic fluid is adapted to be forced, a valve seat in said passage, a rotary valve member in said seat, a supporting member, a thermostat element between said members having torsional movement in response to temperature change, the ends of said thermostat element being connected respectively with said members to be secured against rotational movement relative to said members whereby said valve member will be rotated by the torsional movement of said thermostat element, one of said connections being arranged to permit free axial movement of the respective end of said element whereby said element may lengthen and shorten axially without axially moving said valve member.

12. A valving assembly for controlling the hydraulic fluid flow in a hydraulic shock absorber comprising a rotary valve member, a supporting member adapted to be set in the frame of a shock absorber, a thermostat coil between said members, means securing one end of said coil to one of said members against both rotary and axial movement relative to said member, and means securing the other end of said coil to said other member against rotary movement relative to said member but arranged to permit axial movement thereof whereby said coil may lengthen and shorten axially without axially moving said valve.

RALPH F. PEO.
CARL F. LAUTZ.